US008700786B2

(12) United States Patent
Chong et al.

(10) Patent No.: US 8,700,786 B2
(45) Date of Patent: *Apr. 15, 2014

(54) SYSTEMS AND METHODS FOR TERMINATION OF SESSION INITIATION PROTOCOL

(75) Inventors: Koan S. Chong, East Brunswick, NJ (US); James R. Dobbins, Eatontown, NJ (US); Mark A. Ratcliffe, Oakhurst, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/567,848

(22) Filed: Aug. 6, 2012

(65) Prior Publication Data

US 2012/0297079 A1    Nov. 22, 2012

Related U.S. Application Data

(63) Continuation of application No. 12/111,896, filed on Apr. 29, 2008, now Pat. No. 8,239,554, which is a continuation of application No. 10/776,659, filed on Feb. 11, 2004, now Pat. No. 7,366,782.

(60) Provisional application No. 60/462,780, filed on Apr. 14, 2003.

(51) Int. Cl.
*G06F 15/16* (2006.01)

(52) U.S. Cl.
USPC .......................................................... 709/228

(58) Field of Classification Search
USPC ......... 709/203, 217, 219, 221–225, 228–229; 711/100, 167; 713/1, 100; 714/24
See application file for complete search history.

(56) References Cited

U.S. PATENT DOCUMENTS 6,601,084 B1 * 7/2003 Bhaskaran et al. ........... 718/105
6,615,236 B2   9/2003 Donovan et al.
(Continued)

FOREIGN PATENT DOCUMENTS

JP    5-143204 A    6/1993
JP    5-158585 A    6/1993
(Continued)

OTHER PUBLICATIONS

American National Standard for Telecommunications, Signalling System No. 7 (SS7)—Signalling Connection Control Part (SCCP), ANSI T1.112-2000 (Revision of ANSI T1.112-1996), 2000, Publisher: American National Standards Institute, Inc.

(Continued)

*Primary Examiner* — Tae Kim
*Assistant Examiner* — Eric W Shepperd

(57) ABSTRACT

Systems for graceful termination of support for session initiation protocol communications on a server are described. Systems include techniques for setting a time period for gracefully terminating such support, for sending a service unavailable message to a client, for causing the server to maintain support, until no later than the expiration of the time period for terminating support, for uncompleted session initiation protocol invites accepted by the server before sending the service unavailable message to the client, and for terminating support for session initiation protocol communications on the server no later than upon expiration of the time period for terminating support. Methods for graceful termination of such support and computer-readable storage media whose contents cause a computer system to perform a graceful termination of such support are also described.

20 Claims, 3 Drawing Sheets

(56) References Cited

U.S. PATENT DOCUMENTS

| | | | |
|---|---|---|---|
| 7,046,680 B1 * | 5/2006 | McDysan et al. | 370/396 |
| 7,099,681 B2 | 8/2006 | O'Neill | |
| 7,149,299 B2 | 12/2006 | Triano et al. | |
| 7,366,782 B2 | 4/2008 | Chong et al. | |
| 8,239,554 B2 | 8/2012 | Chong et al. | |
| 2002/0105943 A1 * | 8/2002 | Womack et al. | 370/352 |
| 2002/0174219 A1 * | 11/2002 | Mei et al. | 709/224 |
| 2003/0014461 A1 | 1/2003 | Tanaka | |
| 2003/0014544 A1 | 1/2003 | Pettey | |
| 2003/0046404 A1 * | 3/2003 | O'Neill et al. | 709/228 |
| 2003/0120800 A1 | 6/2003 | Novetzke et al. | |
| 2003/0182427 A1 | 9/2003 | Halpern | |
| 2003/0217099 A1 | 11/2003 | Bobde et al. | |
| 2003/0225875 A1 * | 12/2003 | Revanuru et al. | 709/223 |
| 2004/0028009 A1 * | 2/2004 | Dorenbosch et al. | 370/329 |
| 2004/0177353 A1 | 9/2004 | Rao | |
| 2005/0117529 A1 * | 6/2005 | Ramos-Escano et al. | 370/282 |

FOREIGN PATENT DOCUMENTS

| | | |
|---|---|---|
| JP | 10-327258 | 12/1998 |
| JP | 2003-058435 A | 2/2003 |

OTHER PUBLICATIONS

Information Sciences Institute, DARPA Internet Program Protocol Specification, Internet Protocol, Request for Comments: 791, Sep. 1981.

Koh, mSCTP: Use of SCTP for IP Mobility Support, It Forum Korea 2003, Apr. 2003, pp. 1-24.

Koh, Stream Control Transmission Protocol (SCTP), KRNET 2003, Jun. 26, 2003, pp. 1-28.

Rosenberg et al., SIP: Session Initiation Protocol, Network Working Group, Request for Comments: 3261, Jun. 2002, pp. 1-269, Publisher: The Internet Society.

Sparks, SIP Load Management, Network Working Group, Internet Draft, Oct. 17, 2003, pp. 1-9, Publisher: The Internet Society.

Stewart et al., Stream Control Transmission Protocol, Network Working Group, Request for Comments: 2960, Oct. 2000, pp. 1-134, Publisher: The Internet Society.

* cited by examiner

SYSTEMS AND METHODS FOR TERMINATION OF SESSION INITIATION PROTOCOL

CROSS-REFERENCE TO RELATED APPLICATIONS

This application is a continuation of U.S. patent application Ser. No. 12/111,896, which is currently allowed and is a continuation of U.S. patent application Ser. No. 10/776,659, filed Feb. 11, 2004, now U.S. Pat. No. 7,366,782, which claims the benefit of U.S. Provisional Application No. 60/462,780 filed on Apr. 14, 2003. Each of the above-cited applications is herein incorporated by reference in their entirety.

FIELD OF THE INVENTION

The present invention relates generally to the field of improvements in telecommunications networks supporting session initiation protocol communications, and more particularly to techniques for managing terminations of such communications.

BACKGROUND OF THE INVENTION

Modern telecommunications continue to evolve toward ever increasing use of the Internet for data transmissions. In support of this evolution, myriad traffic format protocols have been defined and implemented to enable transmission of various types of data for defined purposes. Among these protocols is the session initiation protocol (SIP), which is generally used in order to route and initiate the transmission of telecommunications of various types of data. Although SIP is capable of initiating the transmission of data of any type, SIP is particularly useful and desirable for initiating transmission of live communications. In particular, SIP is a preferred protocol for initiating the transmission of live two way voice communications such as telephone calls. As the drive for reduced costs and higher signal quality relentlessly grows, maximizing the quality of SIP initiation of transmission of live voice communications over the Internet is particularly desirable.

Live voice communications in particular demand minimal delays in and failures of initiation of call completion. The quality standards set long ago for time division multiplexing protocols and other systems for transmitting live voice communications must likewise be met for Internet based routing to be competitive. Internet communications depend on remotely located servers to route and initiate the transmission of a given signal through the web of potential pathways constituting the Internet. If a server fails during initiation of transmission of a live voice communication, the conversation may be delayed or never connected. Desirably, provisions are accordingly made to minimize service disruptions resulting from a termination of support for initiation of such communications.

SIP protocol communications overlay the concurrent implementation of stream control transmission protocol (SCTP). SCTP is one of many general purpose communications protocols. SIP protocol communications can provide for initiation of transmissions of voice over Internet protocol (VOIP). Although SIP is particularly useful for initiating transmission of live two way telecommunications such as telephone conversations, SIP does support and can be used for initiating transmission of other live or off line data communications.

SCTP includes a three way handshake shutdown protocol for shutting down SCTP server associations with clients. However, the SCTP handshake shutdown protocol does not provide a means for the server to stop or reject new SIP service invites received from clients while the server completes processing of requests that the server has already received and accepted. As a result, shutting down the SCTP associations prevents the server from responding to some service requests already received, possibly causing a loss of or delay in the calls associated with those requests. Moreover, support for SIP protocol communications cannot be shut down separately from shutdown of all SCTP protocol support.

There is accordingly a need for discrete systems and methods to manage terminations of support for SIP protocol communications, in order to minimize service interruptions and provide improved telecommunications quality.

SUMMARY OF THE INVENTION

According to the present invention, systems and methods are provided to facilitate graceful terminations of support for SIP protocol communications on servers in an Internet protocol network. A graceful termination protocol enables support for SIP protocol communications on such servers to be removed from service in an orderly manner that minimizes disruptions of uncompleted SIP protocol requests to initiate communication transmissions, while not affecting other server operations.

In one embodiment according to the present invention, a system is provided for graceful termination of support for session initiation protocol communications on a server, comprising: a server supporting communications with a client conforming to session initiation protocol; means for setting a time period for gracefully terminating support for session initiation protocol communications on the server; means for sending a service unavailable message to the client; means for causing the server to maintain support, until no later than the expiration of the time period for terminating support, for uncompleted session initiation protocol invites accepted by the server before sending the service unavailable message to the client; and means for terminating support for session initiation protocol communications on the server no later than upon expiration of the time period for terminating support.

In another embodiment according to the present invention, a method is provided for graceful termination of support for session initiation protocol communications on a server, comprising the steps of: establishing communications between a server and a client conforming to session initiation protocol; setting a time period for gracefully terminating support for session initiation protocol communications on the server; sending a service unavailable message to the client; causing the server to maintain support, until no later than the expiration of the time period for terminating support, for uncompleted session initiation protocol invites accepted by the server before sending the service unavailable message to the client; and terminating support for session initiation protocol communications on the server no later than upon expiration of the time period for terminating support.

In a further embodiment according to the present invention, a computer-readable medium is provided whose contents cause a computer system to perform steps of a graceful termination of support for session initiation protocol communications on a server, the steps comprising: establishing communications between a server and a client conforming to session initiation protocol; setting a time period for gracefully terminating support for session initiation protocol communications on the server; sending a service unavailable message to the client; causing the server to maintain support, until no later than the expiration of the time period for terminating support, for uncompleted session initiation protocol invites accepted by the server before sending the service unavailable message to the client; and terminating support for session initiation protocol communications on the server no later than upon expiration of the time period for terminating support.

A more complete understanding of the present invention, as well as further features and advantages of the invention, will be apparent from the following detailed description and the accompanying drawings.

DETAILED DESCRIPTION

The present invention will now be described more fully with reference to the accompanying drawings, in which several presently preferred embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

According to the present invention, systems and methods are provided to facilitate graceful terminations of support for SIP protocol communications on servers in an Internet protocol network. A graceful termination protocol in accordance with the present invention may suitably enable support for SIP protocol communications on such servers to be removed from service in an orderly manner that minimizes disruptions of uncompleted SIP protocol transmissions.

Figure 1:
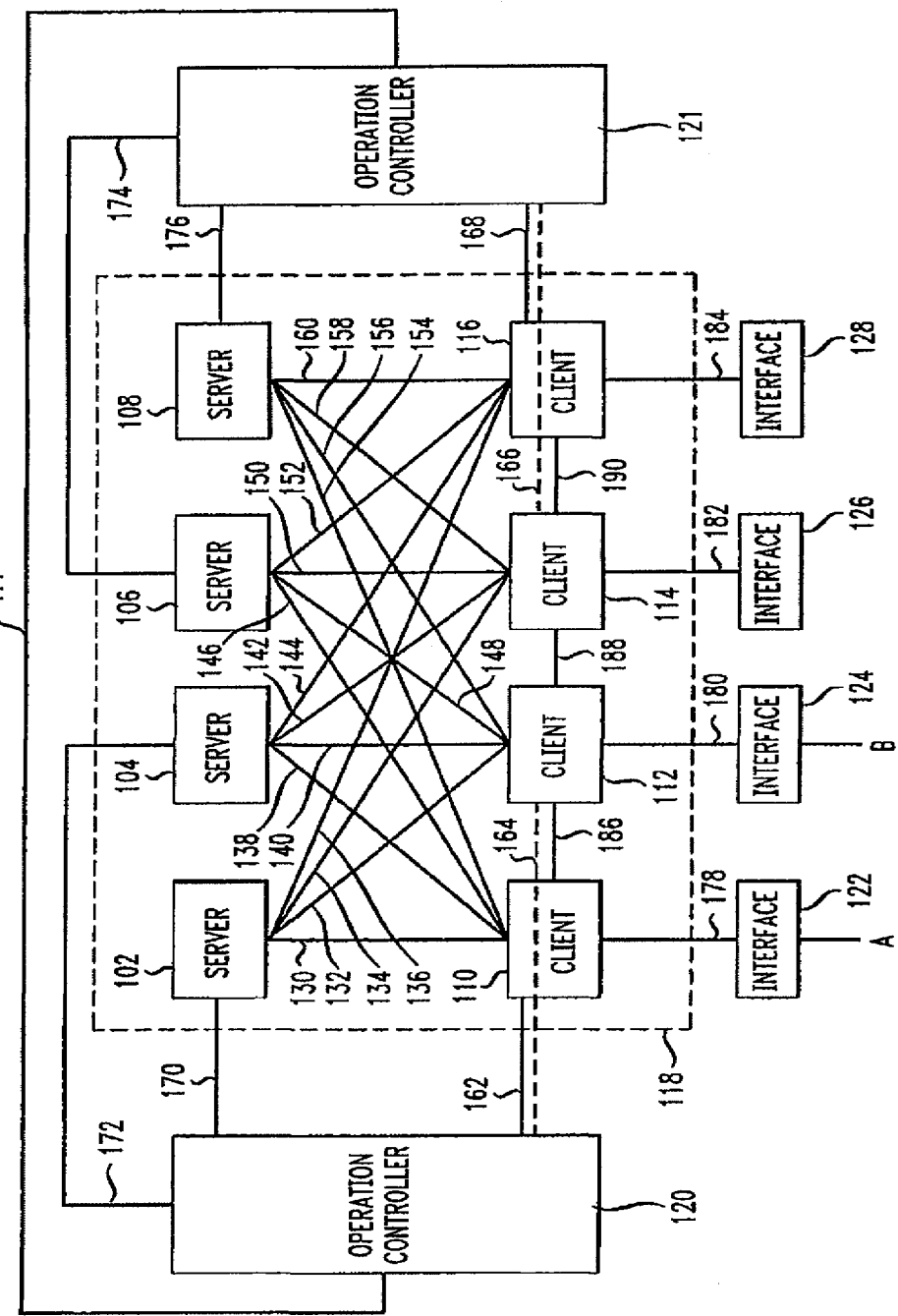
FIG. 1 shows an exemplary system in accordance with the present invention for executing a graceful termination of SIP protocol communications on a server.

FIG. 1 shows an exemplary system 100 comprising servers 102, 104, 106 and 108 and clients 110, 112, 114 and 116 collectively forming an Internet protocol (IP) network 118. In a given system 100, there may be thousands of servers and clients linked together by communication conduits and covering a very large geographical or worldwide area. At any given time, a certain number of servers and clients may need to be removed from service in support of SIP protocol communications. For example, such servers and clients may be due for repair, maintenance or replacement. As the need arises for a particular server to be taken out of service in support of SIP protocol communications, termination of such support on the server in an orderly manner is desirable. Otherwise, an initiating party in a telephone call from point A to point B, for example, may experience a delay in initiation of the call or a failure of the call to be connected over the IP network.

External control over the servers 102-108 and over the clients 110-116 is provided by operation controllers 120 and 121. Interfaces 122, 124, 126 and 128 communicate between local users of the IP network and clients 110-116, respectively. The term "client" herein designates a component on the system 100, such as a switch or another server for example, which is capable of transmitting data to and receiving data from a server in SIP protocol format. A given client may or may not interact with human users.

Server 102 is connected with clients 110, 112, 114 and 116 by SCTP links 130, 132, 134 and 136, respectively. Server 104 is connected with clients 110, 112, 114 and 116 by SCTP links 138, 140, 142 and 144, respectively. Server 106 is connected with clients 110, 112, 114 and 116 by SCTP links 146, 148, 150 and 152, respectively. Server 108 is connected with clients 110, 112, 114 and 116 by SCTP links 154, 156, 158 and 160, respectively. The foregoing SCTP links are transported over an underlying layer of routers on the IP network. Operation controller 120 is connected with clients 110 and 112 by links 162 and 164, respectively. Operation controller 121 is connected with clients 114 and 116 by links 166 and 168, respectively. Operation controller 120 is connected with servers 102 and 104 by links 170 and 172, respectively. Operation controller 121 is connected with servers 106 and 108 by links 174 and 176, respectively. In this exemplary embodiment, links 162-176 do not traverse the IP network 118, although some or all of such links can traverse the IP network as desired. Operation controllers 120 and 121 are connected with each other by link 177. Client 110 communicates with interface 122 by link 178. Client 112 communicates with interface 124 by link 180. Client 114 communicates with interface 126 by link 182. Client 116 communicates with interface 128 by link 184. Clients 110 and 112 communicate with each other by link 186. Clients 112 and 114 communicate with each other by link 188. Clients 114 and 116 communicate with each other by link 190. If desired, further links not shown can be established, such as direct links among the servers 102-108, or further direct links among the clients 110-116. The foregoing links can be implemented in any suitable transmission medium, such as by optical fiber, microwaves, wireless, wire lines, or a combination of these or any other suitable techniques for communications.

The interfaces 122-128 communicate with system users located outside the IP network 118. The IP network 118 facilitates communications among the servers 102-108 and the clients 110-116 over both short and long distances, including intercontinental distances. The interfaces 122-128 connect users located in the vicinity of the clients 110-116, respectively, to the IP network. The interfaces 122-128 can be wholly or partially integrated with the clients 110-116, respectively, or can be separate systems connected by the links 178-184.

Each of the clients 110-116 is a computer system having executable software available to it which enables the client to send and receive communications in Internet protocol format. The entirety of the Internet protocol, Postel, J., "Internet Protocol", STD 5, RFC 791, published September 1981, is hereby incorporated herein by reference. Each of the clients 110-116 further has executable software available to it which enables the client to send and receive communications in SCTP format, which is supported by the Internet protocol. The entirety of the SCTP protocol, Stewart, R., Xie, Q., Morneault, K., Sharp, C., Schwarzbauer, H., Taylor, T., Rytina, I., Kalla, M., Zhang, L., and V. Paxson, "Stream Control Transmission Protocol", RFC 2960, published October 2000, is also hereby incorporated herein by reference. Each of the clients 110-116 also has executable software available to it which enables the client to send and receive communications in SIP format, which is supported by SCTP. The SIP protocol supports provision of VOIP communications. The entirety of the SIP protocol, Rosenberg, J., Schulzrinne, H., Camarillo, G., Johnson, A., Peterson, J., Sparks, R., Handley, M., and F., Schooler, "SIP: Session Initiation Protocol", RFC 3261, published June 2002, additionally is hereby incorporated herein by reference. Revisions in the Internet, SCTP and SIP protocols may be published, for example by the Internet engineering task force (IETF).

Each of the servers 102-108 is a computer system also having executable software available to it which enables the server to send and receive communications in Internet protocol format. Each of such servers 102-108 may be located at a desired central or mutually distant positions in the IP network 118. For example, the servers 102-108 may be located in the same room, in different cities, or on different continents. Each of the servers 102-108 further has executable software available to it which enables the server to send and receive communications in SCTP and SIP protocol formats.

Each of operation controllers 120 and 121 is also a computer system having executable software available to it which enables the operation controller to send and receive communications, typically in TCP-IP format. Operation controllers 120 and 121 are configured to provide external control over the servers 102-108 and over the clients 110-116. Operation controllers 120 and 121 are responsible for management of the system 100. Operation control in the system shown in FIG. 1 is provided by two separate operation controllers 120 and 121. Alternatively, operation controllers 120 and 121 can be integrated so that operation control is provided by a single operation controller. Thus, system 100 can generally include one or more operation controllers exemplified by operation controllers 120 and 121, suitably connected via links such as link 177 as well as links through the IP network 118.

In operation of the system 100, the servers 102-108 and clients 110-116 are activated for SIP protocol communications, as supported by the SCTP and Internet protocols. The servers 102-108 and clients 110-116 can be so activated either directly or as managed by operation controllers 120 and 121. The clients 110-116 typically then initiate and establish SCTP associations on the links 130-160 for purposes of supporting SIP protocol communications with the servers 102-108. In this manner, a mesh network of potential SIP communications links through the IP network 118 is established and ready for use among the servers 102-108 and clients 110-116.

By way of example to illustrate the use of the mesh network, exemplary interface 122 may then receive a request from an initiating party located at point A to establish a telephone call to a receiving party located at point B. As shown in FIG. 1, the interface 122 and client 110 are located near point A, and the interface 124 and client 112 are located near point B, which may be distant from point A. Client 110 obtains the uniform resource identifier (URI) for the destination point B. Client 110 then reviews its listing of active SCTP associations with servers for SIP protocol communications, thus identifying servers 102-108 as potentially available to initiate transmission of the telephone call through the IP network 118. Client 110 compiles a request target list for SIP protocol invites regarding initiation of transmission of the call from point A to point B, and sends SIP protocol invite messages on links 130, 138, 146 and 154 in a defined priority order to servers 102-108, respectively. In this example, server 102 is currently in service, has available capacity, and is in first priority order on the request target list. Accordingly, server 102 sends a message to client 110 accepting the SIP protocol invite. The service invite is then processed by the server 102 and the telephone call is initiated by the server 102 between the initiating party at point A and the receiving party at point B. The path of the telephone call is routed from interface 122 on link 178 to client 110, then on link 186 over the IP network 118 to client 112, over link 180 to interface 124, and finally to the receiving party at point B.

In an alternative embodiment, server 102 may be in redirect mode. In this embodiment, server 102 directs client 110 to request server 104 to process the SIP invite and initiate the call. The path of the telephone call is then routed by server 104 on link 186 in the same manner as in the previous example. In another alternative embodiment, server 102 may be programmed to reject SIP protocol invites having defined characteristics. For example, server 102 may be programmed to reject SIP protocol invites originating from or terminating at defined portions of the system 100.

In accordance with the present invention, each of servers 102-108 further has executable software available to it for initiating, executing and monitoring graceful termination of its support for SIP protocol communications. Hence, each of servers 102-108 can gracefully be taken out of service for initiating communications through use of SIP protocol messages. Accordingly, when exemplary server 102 is designated for termination of SIP protocol support, the system 100 is capable of causing such a graceful termination to occur. Such a termination may be required, for example, in the event of an overload, or if the server 102 requires scheduled repair, maintenance or replacement. By way of illustration, operation controller 120 then may send, or server 102 may itself generate, or may receive from a person acting as system administrator, an instruction to perform a graceful termination of support for SIP protocol communications on exemplary server 102. Server 102 optionally may then either receive from operation controller 120 or itself generate a verification for security purposes that the instruction is properly authorized. No approval of the instruction from clients 110-116 is required, although such approval alternatively could be sought and obtained.

The server 102 then sets a guard timer for a subsequent time period deemed sufficient by the server 102 to complete the processing of all previously accepted SIP protocol invites and initiation of all resulting telephone calls or other communications. The server 102 is engaged in processing requests for routing and initiation of communications rather than carrying the resulting communications themselves. Hence, the server 102 has a discrete queue of message transmissions to be completed before shutdown and can determine an appropriate guard timer period with reasonable accuracy. Once the initiations have been completed, the server 102 is no longer involved in transmission of such resulting communications. Hence, the server 102 can then gracefully refuse to accept further SIP protocol invites without delaying, preventing or interrupting the resulting communications. The guard timer ensures that the SCTP associations of server 102 are taken down for purposes of SIP protocol communications no later than upon expiration of the guard period. In this manner, timely removal of server 102 from online SIP protocol service is ensured. If the server 102 has completed the processing of all previously accepted SIP protocol invites and initiated all resulting telephone calls or other communications before expiration of the guard timer, then the SCTP associations can be taken down before the guard timer expires.

Server 102 then sends service unavailable messages to clients 110-116 indicating that further SIP protocol services are unavailable on the server 102. The service unavailable messages can either be sent to all clients such as exemplary clients 110-116 with which server 102 currently maintains active SCTP associations, or can be prompted by further SIP protocol invites received by server 102. In the latter case, a service unavailable message may only be sent to a given client in response to a SIP protocol invite received by the server 102.

In order to test the graceful termination system, a SIP protocol service unavailable message can alternatively be sent only to operation controller 120 for analysis, without affecting the operations of online clients.

Server 102 optionally sets a defined retry after time period, which is then communicated to clients in the service unavailable messages. The retry after time period is set to be at least as long as the guard timer period, and sufficiently long for server 102 to complete the processing of queued accepted SIP protocol invite messages, send any needed responses to clients 110-116, and remove its SCTP associations for purposes of SIP protocol communications. In this manner, initiation is completed as to all communications for which the server 102 has previously accepted SIP protocol invites before the retry after timer expires. Optionally, the retry after time period can be set to a default value, such as a defined period in addition to the period of guard timer, by operation controller 120 or by the server 102 itself.

Exemplary client 110 then receives the SIP protocol service unavailable message and optionally sets a countdown timer for the duration of the retry after time period. Client 110 then optionally refrains from sending SIP protocol invites to server 102 for the duration of the retry after time period. Server 102 declines to accept, for the duration of the retry after time period, any further SIP protocol invites that are sent to server 102. Client 110 optionally deletes server 102 for the duration of the retry after period from its listing of active SCTP associations for purposes of generating further SIP protocol invite messages. Clients 112, 114 and 116 may carry out these same steps.

Server 102 then attempts to complete the processing of all queued SIP protocol invites previously accepted by the server 102, including all service messages that need to be sent to clients. No later than upon expiration of the guard period timer, server 102 then removes its SCTP associations from SIP protocol service, and optionally reports to operation controller 120 that graceful termination of SIP protocol communications has been completed. Server 102 is then ready for execution of further partial or complete terminations of support for other communication protocols, as well as maintenance and other offline procedures.

Following removal of their SCTP associations for SIP protocol communications with server 102, clients 110-116 cannot send SIP invite messages to server 102. However, exemplary client 110 can use its active SCTP associations with alternative servers 104, 106 and 108 in order to transmit SIP protocol invites. For example, a telephone call initiated at point A and to be received at point B can be routed by server 104 through the IP network 118.

Optionally, client 110 may prioritize its SIP protocol invite messages in an orderly manner. For example, client 110 may prioritize delivery of SIP protocol invite messages to servers 102-108 based on their locations relative to client 110 or based on their locations along the route for a given transmission. Alternatively, client 110 may prioritize such deliveries on a round robin, primary-secondary, or other basis, choosing servers 102, 104, 106, and 108 in a selected order and then repeatedly cycling through the same order. Client 110 may be instructed, for example by operation controller 120, to skip a designated server. Client 110 may reflect this prioritization in its list of active SCTP associations for SIP protocol communications. For example, client 110 may establish in its SCTP associations list a pointer marking the last server to which a SIP protocol invite was transmitted. In generating its next SIP protocol invite message, client 110 then chooses the next SCTP association in its list of active SCTP associations as the SIP protocol invite message destination. If there is no reply to a given SIP protocol invite message within a defined SIP invite message response period, then client 110 sends a SIP protocol invite message to the next server in its list of active SCTP associations. In the event that there is no timely response to any of the SIP invite messages sent to all of the servers on the active SCTP association list, then client 110 may communicate with a non Internet protocol server such as a time division multiplexing (TDM) server in order to route a given call.

Optionally, clients 110-116 monitor the SIP protocol support status of server 102 while SIP protocol support is unavailable on the server. Optionally, clients 110-116 may attempt to send server status messages to server 102 in order to maintain an ongoing complete listing of their active SCTP associations for SIP protocol communications. Optionally, clients 110-116 can be notified of the scheduled time for return of server 102 to SIP protocol service. In this manner, clients 110-116 can check on the availability of server 102 for SIP protocol communications and notify operation controller 120 if server 102 is not back online for SIP protocol communications as scheduled. Such notification can serve as a backup to direct monitoring of server 102.

Eventually, support for SIP protocol communications may be re-established on server 102. Clients 110-116 then receive responses to server status messages sent to server 102, indicating that server 102 is back online for SIP protocol communications. Clients 110-116 may then add server 102 to listings of their active SCTP associations for SIP protocol communications and recommence sending SIP protocol invites to server 102.

Although the operation of system 100 as discussed above is in the context of transmission of telephone calls, the SIP protocol as supported by the SCTP and Internet protocols also facilitates initiations of electronic transmission of other data streams. The same system configuration and operating procedures can be employed for initiating transmissions of such data streams as with telephone communications.

Figure 2:
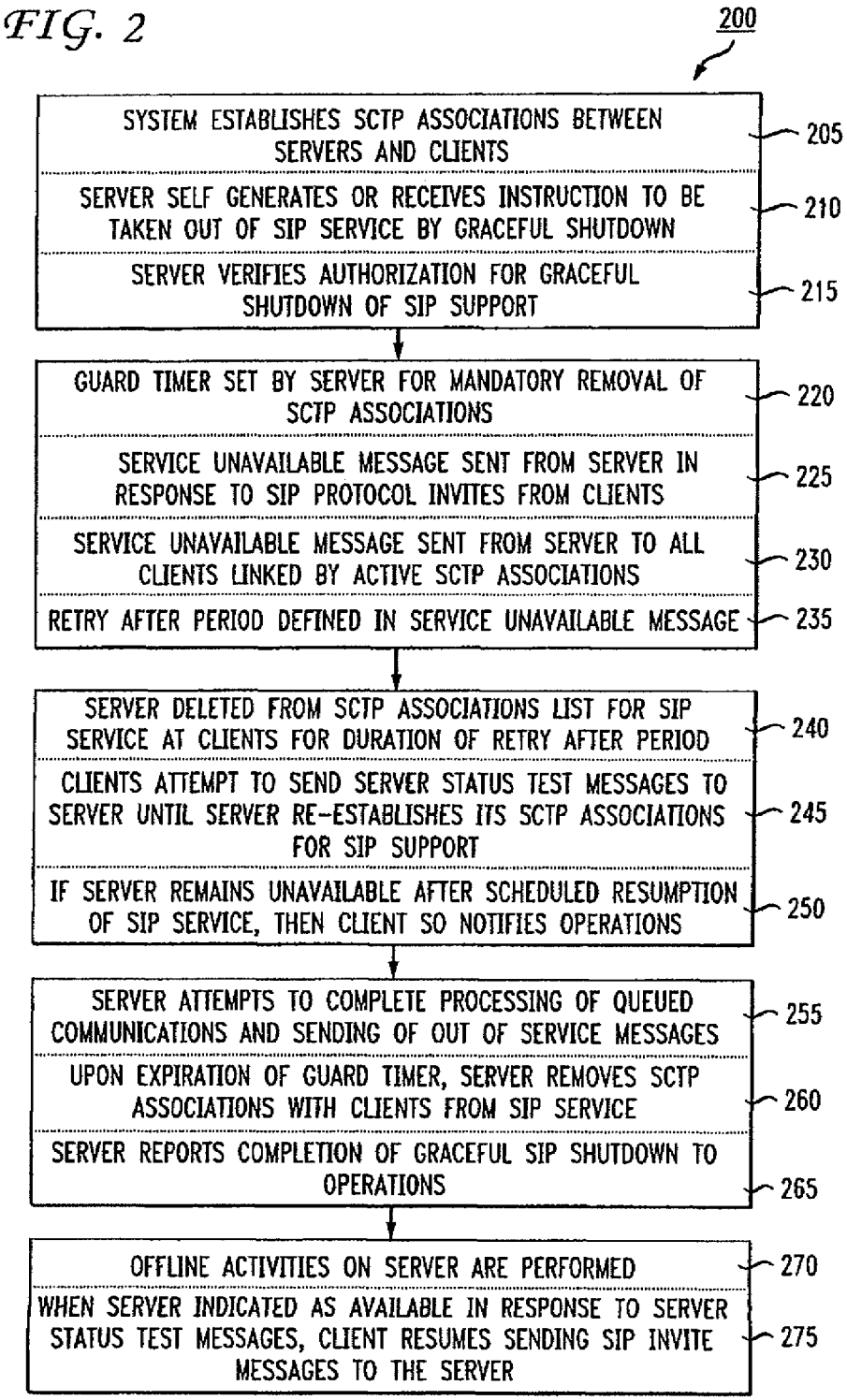
FIG. 2 shows an exemplary method in accordance with the present invention for executing a graceful termination of SIP protocol communications on a server.

FIG. 2 shows an exemplary method 200 for carrying out the graceful termination of SIP protocol communications. The exemplary method 200 employs the system 100 comprising servers 102-108, clients 110-116, and operation controllers 120 and 121, linked together by communications conduits as discussed above in connection with FIG. 1. The system 100 supports SIP, SCTP and Internet protocol communications.

In phase I including steps 205, 210, and 215, a system in normal operating mode is established for support of SIP protocol communications, and a decision is made to gracefully shut down such support.

At step 205, SCTP associations are established for SIP protocol communications between the exemplary servers 102-108 and exemplary clients 110-116 of the exemplary system 100. SCTP associations can be initiated by either the servers or clients as needed. Typically, SCTP associations are initiated by a client that has been offline and is now being placed in service on the system 100. By way of illustration, in this example, each of the exemplary clients 110-116 establishes SCTP associations for SIP protocol communications with each of the exemplary servers 102-108. In an alternative embodiment, SCTP associations may be selectively established between servers and clients to suit current or ongoing needs of the system 100. Once the desired SCTP associations are established, the system 100 is in normal operating mode to support SCTP protocol communications, and can be used to satisfy SCTP protocol service demands. Service demands can originate, for example, from receipt by exemplary interfaces 122-128 of requests for telephone call routing from end users.

End users can be located, for example, at exemplary points A and B which are connected with the system 100 and located remotely from each other.

At step 210, exemplary server 102 self generates or receives from operation controller 120 or from a person acting as system administrator, an instruction to be taken out of service for SIP protocol communications by graceful termination. Optionally at step 215, authorization for the graceful termination instruction is verified. Verification can be done, for example, by server 102 itself or by operation controller 120. Unauthorized termination of a server for SIP protocol communications unnecessarily removes system capacity from service.

In phase II including steps 220, 225, 230 and 235, the exemplary server 102 sets a guard timer to govern the graceful termination, and optionally communicates the scheduled termination to clients.

At step 220, the exemplary server 102 sets a guard timer, which governs the timely removal of the server's SCTP associations for SIP protocol communications. The guard timer is set by the server 102 for a time period expected to be sufficient to enable the server to complete the processing of all queued requests to initiate communications, send any further messages regarding its impending removal from SIP protocol service, and remove its SCTP associations for SIP protocol communications.

At step 225 the exemplary server 102 sends service unavailable messages in response to further SIP protocol invites received from specific clients such as exemplary client 110. At step 230, the exemplary server 102 sends a SIP protocol service unavailable message to all clients linked to the server by active SCTP associations. Steps 225 and 230 both provide similar announcements to the exemplary clients 110-116 regarding the graceful termination of SIP protocol communications on exemplary server 102. Accordingly, instead of performing both of steps 225 and 230, one of them may be selected for use on the system 100 or for use in a particular graceful termination of a server for SIP protocol communications. At step 235, a retry after period is optionally set by the server 102 and included in the service unavailable messages.

In phase III including steps 240, 245 and 250, clients respond to the scheduled termination, and plan their own operations.

Optionally at step 240, in response to the service unavailable message, exemplary client 110 sets a countdown timer based on the retry after timer communicated from the server 102 and removes the designation of exemplary server 102 from its listing of active SCTP associations for SIP protocol communications for the duration of the countdown period. Exemplary client 110 then uses other servers as indicated on its listing of active SCTP associations in order to request routing of communications by sending SIP protocol invites, until server 102 is back online.

At step 245, the exemplary client 110 optionally attempts to send server status test messages to the server 102 until the server 102 re-establishes its SCTP association for SIP protocol communications with client 110. Client 110 may wait until expiration of the retry after period before it commences sending server status test messages to the exemplary server 102.

At step 250, client 110 may be notified by server 102 of a scheduled time for SIP protocol service to be restored on the server. After expiration of the scheduled time, the exemplary client 110 optionally notifies operation controller 120 if the exemplary server 102 is not then back online for SIP protocol communications on the system 100.

In phase IV including steps 255, 260 and 265, the graceful termination is executed by the exemplary server 102.

At step 255 the exemplary server 102 attempts to complete the processing of all queued SIP protocol invites previously accepted, and to complete the transmissions of any needed messages to the clients 110-116. At step 260, no later than upon expiration of the guard timer, server 102 then removes its SCTP associations from SIP protocol service.

Optionally at step 265, the exemplary server 102 reports to operation controller 120 that the graceful termination for SIP protocol communications has been completed. In this manner, operation controllers 120 and 121 can manage the overall system 100. Although SIP protocol communications with the exemplary server 102 are thus shut down, the server may remain powered up and still support other SCTP protocol communications and other communication protocols. Alternatively, the server 102 may be taken offline as to all communication protocols or powered down, in order to facilitate offline maintenance and other procedures.

In phase V including steps 270 and 275, further optional activities occur with respect to the exemplary server 102. At step 270, offline maintenance and other procedures may be performed on the exemplary server 102. If, for example, the graceful termination was executed to remedy a service overload on the server 102, this step can be omitted. At step 275, when the exemplary client 110 receives a server available message from exemplary server 102 in response to a server status test message, then client 110 optionally reactivates the designation of server 102 on its SCTP associations listing for SIP protocol communications. Exemplary client 110 may then recommence sending SIP protocol invites to server 102 in its prioritized listing of available servers.

Figure 3:
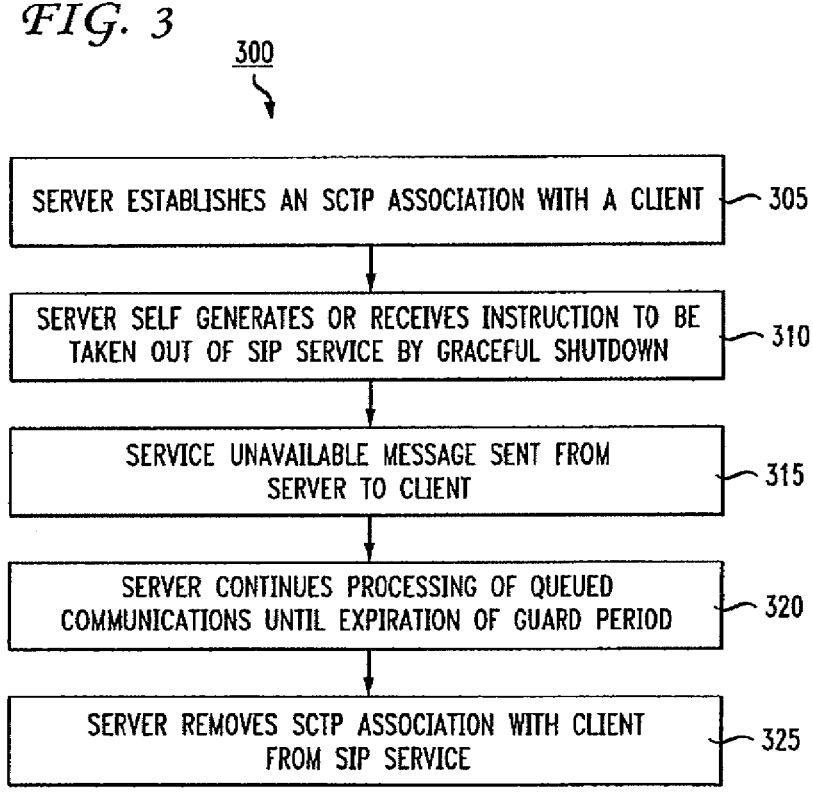
FIG. 3 shows another exemplary method in accordance with the present invention for executing a graceful termination of SIP protocol communications on a server.

FIG. 3 shows another exemplary method 300 for carrying out the graceful termination of SIP protocol communications. The exemplary method 300 employs the server 102, the client 110, and the operation controller 120, arranged in a manner consistent with and linked together by communications conduits as discussed in connection with FIG. 1.

In step 305, the server 102 establishes an SCTP association with the client 110. The server 102 and the client 110 both support communications in SIP, SCTP and IP protocols.

In step 310, the server 102 itself generates, or the operation controller 120 or a person acting as a system administrator generates and sends to the server 102, an instruction for the server 102 to be taken out of service support for SIP protocol communications by graceful termination.

In step 315, server 102 sends a service unavailable message to client 110. This service unavailable message may indicate that no further SIP protocol invites are to be sent to server 102 or will be accepted by server 102 until after a defined retry after period.

In step 320, server 102 continues attempting to complete the processing of queued SIP protocol invites and related communications with clients, but no longer than until expiration of a defined guard period. Optionally, no further SIP protocol communications are initiated by the client 110 with the server 102 between receipt of the service unavailable message and expiration of the defined retry after period.

In step 325, server 102 removes its SCTP association with client 110 from support for SIP protocol communications no later than upon expiration of the guard period. If server 102 completes the processing of all queued SIP protocol invites and related communications with clients before the guard period expires, the SCTP association can be then removed before expiration of the guard period.

Although the graceful termination protocols discussed above in connection with FIGS. 1-3 are implemented in software, in other embodiments all or portions of the instruction steps executed by software may be resident in firmware or in other program media in connection with one or more computers, which are operative to communicate with a telecommunication system supporting Internet, SCTP and SIP protocols. The term software as used in this specification refers to and includes all such forms of executable instructions. The term server as used in this specification refers to and includes any microprocessor system capable of executing software code implementing SIP protocols.

The present teachings may be adapted to a variety of contexts consistent with this disclosure and the claims that follow. For example, although the above discussions of FIGS. 2 and 3 make reference to the exemplary system 100 shown in FIG. 1, the exemplary methods shown in FIGS. 2 and 3 can be implemented on other systems, and the system 100 can be modified as discussed herein. For example, any desired number of one or more servers and clients can be incorporated in the system. Optional steps and features as discussed in connection with FIG. 2 can be added to the method discussed in connection with FIG. 3. Operations can be centrally located in a single center or in a plurality of centers, or distributed into an array of nodes in mutual communication, or otherwise configured as desired. Any desired number of interfaces can be employed, and their tasks can be wholly or partially performed by the clients. The decision making, control and communication responsibilities regarding graceful termination, such as setting timers and sending announcements, can be performed as desired in whole or part by servers, operations centers, or other suitable components on the system. The orders of execution of the steps as shown in FIGS. 2 and 3 as discussed above are exemplary and non limiting. For example, once a graceful termination decision has been made and communicated to a client, ensuing steps to be performed by servers can be performed simultaneously, before or after performance of steps by clients.

We claim:

1. A method for terminating a support for session initiation protocol communications, comprising:
    establishing, by a processor of a server, communications between the server and a client conforming to session initiation protocol;
    setting, by the processor, a time period for terminating the support for session initiation protocol communications on the server, wherein the server rejects all session initiation protocol invites received after the time period is set and removes stream control transmission protocol associations, wherein the time period is set in accordance with an amount of time that is sufficient for processing uncompleted session initiation protocol invites accepted by the server; and
    sending, by the processor, a service unavailable message to the client.

2. The method of claim 1, further comprising:
    sending the service unavailable message to the client in response to a session initiation protocol invite received by the server from the client.

3. The method of claim 1, wherein the time period for terminating the support for session initiation protocol communications is provided along with the service unavailable message.

4. The method of claim 1, further comprising:
    rejecting a session initiation protocol service invite received on the server after sending the service unavailable message to the client.

5. The method of claim 1, further comprising:
    causing a second server to support communications with the client conforming to session initiation protocol.

6. The method of claim 1, further comprising:
    receiving a server status test message by the server until the server re-establishes support for session initiation protocol communications with the client.

7. The method of claim 6, wherein the server status test message is received in accordance with a scheduled time as to when the server will return to supporting the session initiation protocol communications.

8. A non-transitory computer-readable medium storing a plurality of instructions, which, when executed by a processor of a server, cause the processor to perform operations for terminating a support for session initiation protocol communications, the operations comprising:
    establishing communications between the server and a client conforming to session initiation protocol;
    setting a time period for terminating the support for session initiation protocol communications on the server, wherein the server rejects all session initiation protocol invites received after the time period is set and removes stream control transmission protocol associations, wherein the time period is set in accordance with an amount of time that is sufficient for processing uncompleted session initiation protocol invites accepted by the server;
    sending a service unavailable message to the client; and
    terminating the support for session initiation protocol communications on the server no later than an expiration of the time period for terminating the support for session initiation protocol communications.

9. The non-transitory computer-readable medium of claim 8, further comprising:
    sending the service unavailable message to the client in response to a session initiation protocol invite received by the server from the client.

10. The non-transitory computer-readable medium of claim 8, wherein the time period for terminating the support for session initiation protocol communications is provided along with the service unavailable message.

11. The non-transitory computer-readable medium of claim 8, further comprising:
    rejecting a session initiation protocol service invite received on the server after sending the service unavailable message to the client.

12. The non-transitory computer-readable medium of claim 8, further comprising:
    causing a second server to support communications with the client conforming to session initiation protocol.

13. The non-transitory computer-readable medium of claim 8, further comprising:
    receiving a server status test message by the server until the server re-establishes support for session initiation protocol communications with the client.

14. The non-transitory computer-readable medium of claim 13, wherein the server status test message is received in accordance with a scheduled time as to when the server will return to supporting the session initiation protocol communications.

15. A system for terminating a support for session initiation protocol communications, comprising:
    a processor of a server; and
    a computer-readable medium storing a plurality of instructions which, when executed by the processor, cause the processor to perform operations, the operations comprising:

establishing communications between the server and a client conforming to session initiation protocol;

setting a time period for terminating the support for session initiation protocol communications on the server, wherein the server rejects all session initiation protocol invites received after the time period is set and removes stream control transmission protocol associations, wherein the time period is set in accordance with an amount of time that is sufficient for processing uncompleted session initiation protocol invites accepted by the server; and sending a service unavailable message to the client.

16. The system of claim 15, further comprising:

sending the service unavailable message to the client in response to a session initiation protocol invite received by the server from the client.

17. The system of claim 15, wherein the time period for terminating the support for session initiation protocol communications is provided along with the service unavailable message.

18. The system of claim 15, further comprising:

rejecting a session initiation protocol service invite received on the server after sending the service unavailable message to the client.

19. The system of claim 15, further comprising:

causing a second server to support communications with the client conforming to session initiation protocol.

20. The system of claim 15, further comprising:

receiving a server status test message by the server until the server re-establishes support for session initiation protocol communications with the client.

\* \* \* \* \*